INVENTOR.
Otakar Horna
BY Richard Lowe
Agt

INVENTOR.
Otakar Horna
BY Richard Low
Agt

Feb. 18, 1964 O. HORNA 3,121,810

PULSE COUNTER WITH TUNNEL DIODES

Filed Nov. 15, 1961 3 Sheets-Sheet 3

INVENTOR.
Otakar Horna
BY Richard [illegible]
Agt

United States Patent Office 3,121,810
Patented Feb. 18, 1964

3,121,810
PULSE COUNTER WITH TUNNEL DIODES

Otakar Horna, Prague, Czechoslovakia, assignor to Vyzkumny ustav matematickych stroju, Prague, Czechoslovakia Filed Nov. 15, 1961, Ser. No. 152,468
Claims priority, application Czechoslovakia Dec. 10, 1960
7 Claims. (Cl. 307—88.5)

The present invention relates to a pulse counter equipped with tunnel diodes. Pulse counters of this type are finding widespread use, in particular in connection with digital computers.

According to the essential feature of the present invention the counter comprises at least two tunnel diodes. The plates of said tunnel diodes are connected to the following three points: through plate resistors to a source of D.C. voltage, further through condensers to the input terminals of the counter and finally are the plates of the tunnel diodes interconnected through coupling resistors. Said two, or possibly more, tunnel diodes used in the counter form a chain, the last tunnel diode of which is connected either to a transistor base or to the grid of an electron tube. The counter comprises further a transformer with three windings: one winding is arranged in the circuit of said transistor or electron tube, the second winding is series connected to the aforesaid source of D.C. voltage, while the third winding is attached to the output terminals of the counter.

Figure 1:
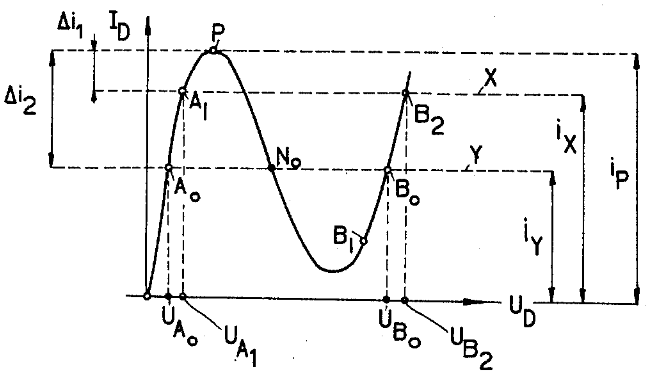
Figure 2:
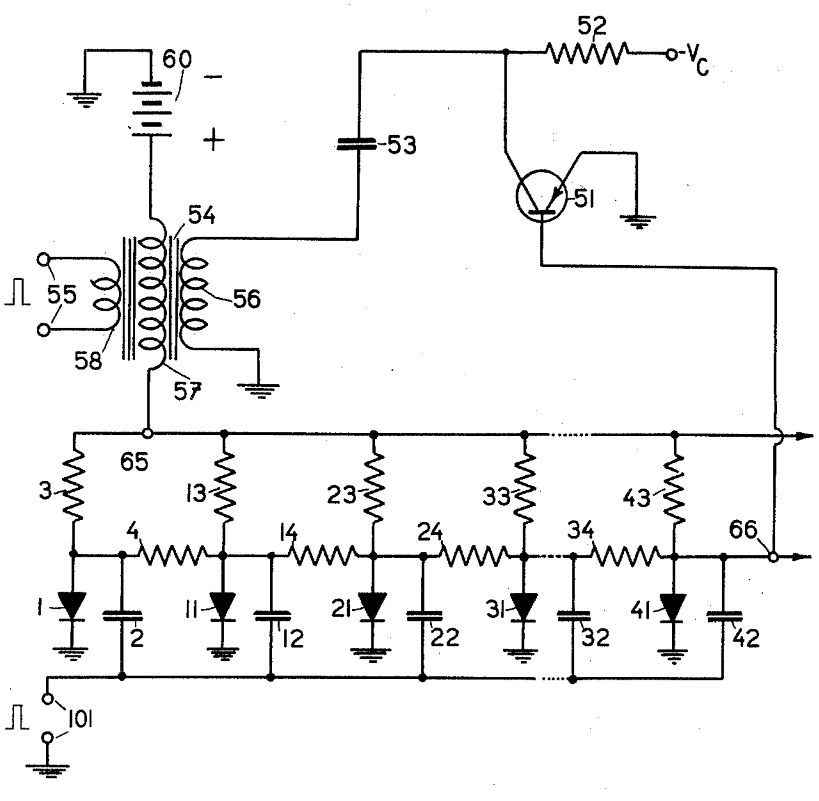
Figures 3, 5:
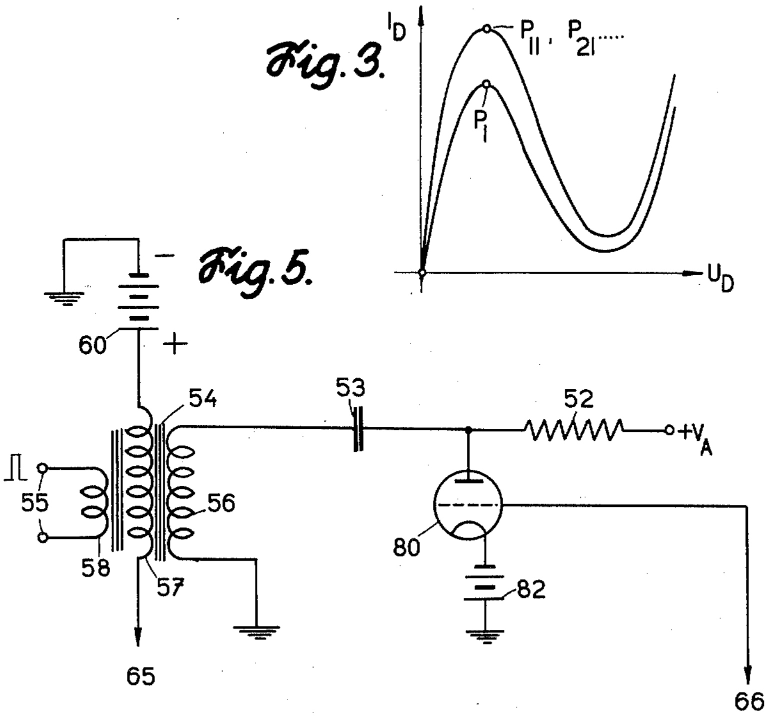
Figure 6:
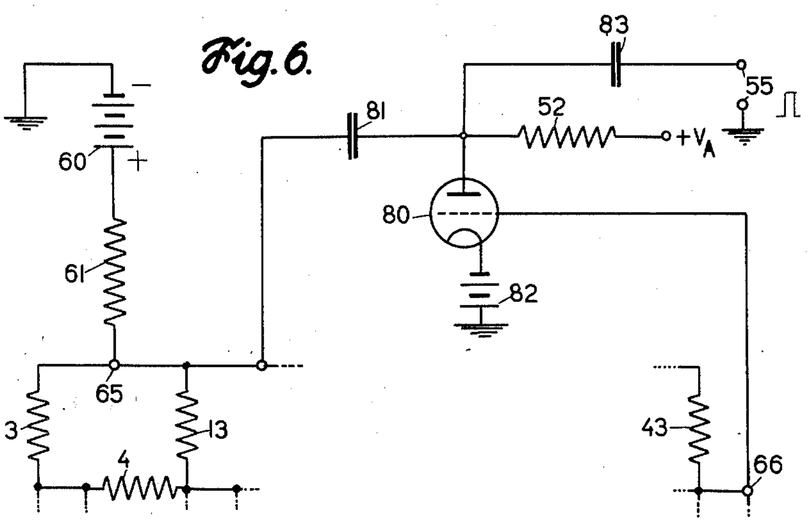
Figure 4:
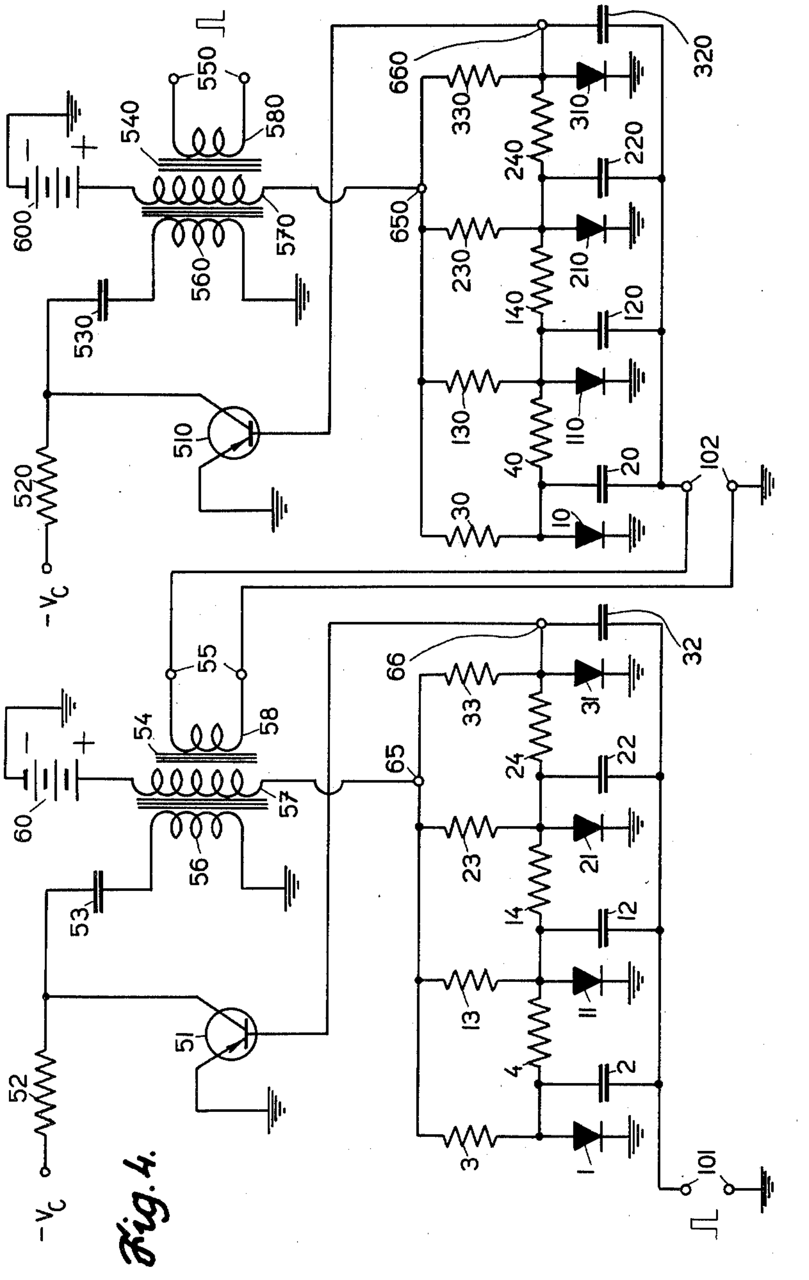

In order that the invention may be clearly understood and readily carried into effect, the same will now be described with reference to, and by the aid of, the accompanying drawings, in which FIG. 1 shows the general characteristic of a tunnel diode, FIG. 2 is an exemplary embodiment of a counter according to the invention equipped with five tunnel diodes, FIG. 3 depicts the characteristics of the tunnel diodes used, FIG. 4 represents a cascade connection of two counters according to the invention, FIG. 5 shows a modified arrangement using an electron tube, and FIG. 6 illustrates a further modification with resistance-capacity coupling.

Referring first to FIG. 2 of the drawings, the counter represented therein is arranged in the following manner. Five tunnel diodes 1, 11, 21, 31 and 41 form a chain. The plates of all these tunnel diodes are connected on the one hand through respective anode resistors 3, 13, 23, 33 and 43 and through a winding 57 of a transformer 54 to a source 60 of D.C. voltage and, on the other hand, over respective capacitors 2, 12, 22, 32 and 42 to input terminals 101. Said plates are further interconnected by means of coupling resistances 4, 14, 24 and 34. A further winding 56 of the transformer 54 is connected through a capacitor 53 to the collector of a transistor 51 and further through another resistor 52 to the supply of a negative feed voltage $-V_C$ serving for the transistor 51. The emitter of said transistor 51 is grounded and its base is connected to the plate of the last tunnel diode 41 of the chain. The cathodes of all tunnel diodes of the chain are grounded.

The operation of the counter according to the invention follows from the characteristic of the tunnel diode as represented in FIG. 1. The voltage of the source 60 and the respective plate resistors 13, 23 and 33 are chosen such as to cause the load line Y to intersect the characteristic of the tunnel diode in three points $A_0$, $B_0$, $N_0$. The working points $A_0$ and $B_0$ are stable, because they are situated in a region in which the ohmic resistance of the tunnel diode is positive. The point $N_0$, on the other hand, lying in the region of negative resistance of the tunnel diode is unstable. The plate resistance 3 of the first tunnel diode 1 in the chain differs from the aforementioned resistances, said plate resistance 3 having such a value that its respective load line X intersects the characteristic of the tunnel diode 1 in the point $A_1$. The tunnel diode 1 operates, therefore, with a higher working current $i_X$ than all other tunnel diodes, i.e. diodes 11, 21, 31 and 41 of the chain whose working current is $i_Y$.

After applying the plate voltage from the source 60, the working current of the first tunnel diode is therefore set to point $A_1$; working currents of the other tunnel diodes are set to point $A_0$. A substantially identical voltage $U_{A_0}$ prevails under these circumstances on all tunnel diodes 11, 21, 31 and 41 with the exception of the first tunnel diode 1, which shows a slightly higher plate voltage $U_{A_1}$. As a result, practically no current flows through the coupling resistances 4, 14, 24 and 34.

If to the input terminals 101 a positive voltage pulse is applied of such a magnitude and such a shape that through the condensers 2, 12, 22, 32 and 42 a current passes which is larger than the current $\Delta i_1$ and smaller than the current $\Delta i_2$, the current flowing through the first tunnel diode increases above the value $i_p$. The first tunnel diode assumes a state corresponding to point $B_2$ on the characteristic, with the result that with the same current $i_x$ the voltage across the first tunnel diode 1 is increased from the value $U_{A_1}$ to the value $U_{B_2}$. The remaining tunnel diodes—with the exception of the second tunnel diode 11—will shift their working points from $A_0$ to $A_1$ as long as the pulse lasts, so that after its termination they return to point $A_0$. Current starts to flow through the second tunnel diode 11 by the action of the coupling resistance 4, since there is a higher voltage ($U_{B_2}$) across the plate of the first tunnel diode 1 than across the plate of the second tunnel diode 11, where the voltage amounts to $U_{A_0}$. Under the influence of this current the working current of the second tunnel diode 11 is shifted to point $A_1$.

On arrival of a further pulse to the input terminals 101, the first tunnel diode 1 shifts its working point in the direction from point $B_0$ to point $B_2$, with the result that after this pulse is terminated, the first tunnel diode 1 returns to its initial state, which is given by the point $B_2$. The second tunnel diode 11, which prior to the arrival of said pulse was in the state $A_1$, is caused by said pulse to assume the state $B_0$ in the same way as in the preceding cycle the first tunnel diode was caused to operate—i.e. to the state $B_0$. The second tunnel diode 11 remains in the state $B_0$ even after disappearance of said pulse. The other tunnel diodes—with the exception of the third tunnel diode 21—return to the state $A_0$. Said third tunnel diode 21, due to the current passing through the coupling resistance, was caused to shift its working point to $A_1$. Upon arrival of a third pulse, the third tunnel diode 21 assumes therefore a state corresponding to the point $B_0$ and shifts the working point of the fourth tunnel diode 31 to the point $A_1$. Consequently, the next pulse arriving at the terminal 101 triggers said fourth tunnel diode 31 etc. This process continues until the last tunnel diode 41 in the chain is triggered.

It will be noted from the foregoing that every pulse arriving at the input terminals 101 triggers one tunnel diode from the state $A_0$ to the state $B_0$, with the exception of the first tunnel diode 1 which is triggered by the first pulse from the state $A_1$ to the state $B_2$. The number of pulses received by the counter is expressed or indicated by the number of those tunnel diodes in the chain which are in a state with a higher plate voltage $U_{B_0}$ or $U_{B_2}$.

As soon as the last—in the case under consideration fifth—tunnel diode 41 of the chain is triggered to the state $B_0$, the voltage across the base of the transistor 51 is increased, since this base is connected to the point 66 i.e. to the plate of said fifth tunnel diode 41. As a result, current starts to flow through the transistor 51, said current causing the capacitor 53 to be discharged over the winding 56 of the transformer 54. A voltage pulse is thus produced on the winding 57, the polarity of said voltage pulse being opposed to the polarity of the source 60. This is the reason why the voltage across the point 65 and thus across the plates of all tunnel diodes 1, 11, 21, 31 and 41 drops to zero, as long as said pulse is effective. After disappearance of said pulse, all above tunnel diodes return, therefore, to the state $A_0$ or $A_1$. In this way the counter is prepared to receive a further pulse train applied to the input terminals 101.

The voltage pulse produced on the winding 57 is transferred also to the winding 58 and is taken off the output terminals 55 as a pulse which indicates that the counter chain has been filled once. In the example under consideration this means that after five pulses are applied to the input terminals 101 one pulse will appear at the output terminals 55, which indicates the sum of said five pulses applied to the input terminals 101.

It will be apparent from the foregoing disclosure that the first tunnel diode 1 or its circuit must necessarily have somewhat different parameters than the other tunnel diodes of the chain and their circuits. This requirement can be met in various ways: The plate resistance 3, for example, can have a lower value than the other plate resistances 13, 23, 33 and 43. According to another modification the first tunnel diode 1 in the chain has a peak current $P_1$ which is lower than the peak currents $P_{11}$, $P_{22}$ etc. of the other tunnel diodes 11, 21, 31, 41 of the chain. This relation is shown in FIG. 3 illustrating the characteristic of the first tunnel diode 1 and the characteristic which is common to all the other tunnel diodes in the chain. Due to this arrangement it can be achieved that after the arrival of the first pulse at the input terminal 101 it is only the first tunnel diode 1 which is triggered.

A further advantage of the counter according to the invention lies in that it facilitates the combination of a plurality of such counters to a cascade connection. The output terminals of one counter are then connected to the input terminals of the following counter. FIG. 4 shows an example of a cascade connection of two counters, each of which comprises a chain with four tunnel diodes. The first counter resembles entirely the counter according to FIG. 2. Its output terminals 55 are connected to input terminals 102 of the following counter. All component parts of the second counter are marked with analogous reference numerals as used in the first counter, the only difference being that a nought is added to each of them (except input terminals 102).

FIG. 5 shows a modified embodiment of the invention, wherein in place of the transistor 51 an electron tube 80 is used, to whose plate a positive plate voltage $V_A$ is applied and whose grid is connected to the point 66, i.e. to the plate of the last tunnel diode in the chain.

FIG. 6 represents a further modification, in which a resistance-capacity coupling substitutes for the transformer coupling. Also in this case an electron tube 80 is used which is heated from a source 82 and whose grid is connected to the point 66, i.e. to the last tunnel diode in the chain. The plate of said electron tube 80 is supplied with D.C. plate voltage $V_A$ through the resistance 52 and at the same time connected over a capacitor 83 to the output terminals 55. The same plate is further connected to the junction point 65, to which D.C. voltage is supplied by a source 60 through the resistance 61.

In both above mentioned cases the passage of plate current of a required value is achieved by supplying the grid of the electron tube 80 with the necessary voltage from the point 66 i.e. from the plate of the last tunnel diode 41 of the chain. The capacitor 53 or 81 is thus discharged either through the winding 56 of the transformer 54 (FIG. 5) or through the resistance capacity coupling 61, 83 to the output terminals 55.

What I claim is:

1. A pulse counter comprising at least two tunnel diodes each having a plate and a cathode, a source of direct-current voltage connected to the plates of said tunnel diodes, plate resistors respectively interposed between said plates and said source of voltage, two input terminals, one of said input terminals being connected to a point of reference potential and the other one of said terminals being connected to the plates of said tunnel diodes, capacitors respectively interposed between the plates of said tunnel diodes and the other one of said input terminals, coupling resistance means interconnecting the plates of said tunnel diodes, and means connecting the cathodes of said tunnel diodes to said point of reference potential.

2. A pulse counter comprising at least two tunnel diodes each having a plate and a cathode, a source of direct-current voltage connected to the plates of said tunnel diodes, plate resistors respectively interposed between said plates and said source of voltage, two input and two output terminals, one of said input terminals being connected to a point of reference potential and the other one of said input terminals being connected to the plates of said tunnel diodes, capacitors respectively interposed between the plates of said tunnel diodes and the other one of said input terminals, coupling resistance means interconnecting the plates of said tunnel diodes which are thereby joined to form a chain, means connecting the cathodes of said tunnel diodes to said point of reference potential, and means responsive to the voltage appearing across the last tunnel diode in the chain for applying an output pulse to said output terminals.

3. A pulse counter as in claim 2 wherein the first tunnel diode in the chain has a lower peak current than all other tunnel diodes in the chain.

4. A pulse counter as in claim 2 wherein the value of the plate resistor of the first tunnel diode in the chain is lower than the value of the plate resistor of any one of the other tunnel diodes in the chain.

5. A pulse counter comprising at least two tunnel diodes each having a plate and a cathode, a source of direct-current voltage, a transformer having three windings, a transistor having a base, an emitter and a collector, two output terminals, two input terminals, one of said two input terminals being connected by means of a common ground connection to said cathodes of said tunnel diodes, the second one of said two input terminals being connected by means of respective capacitors to the plates of said tunnel diodes, resistors respectively interconnecting the plates of said tunnel diodes to a junction point to which is also connected one end of the first one of said three windings of the transformer, the second end of said first winding being connected to one terminal of said source of direct-current voltage, the second terminal of said source of direct-current voltage being connected by means of the common ground connection to the cathodes of said tunnel diodes, coupling resistors interconnecting the plates of said tunnel diodes to form a chain, means responsive to the voltage appearing across the last one of said tunnel diodes in the chain for driving the base of said transistor, the emitter of said transistor being connected by means of the common ground connection to the cathodes of said tunnel diodes, the collector of said transistor being connected by means of a capacitor to one end of the second winding of said transformer, bias source means connected to the collector of said transistor, the second end of said second winding being connected by means of the common ground connection to the cathodes of said tunnel diodes, the ends of the third winding of said transformer being respectively connected to said two output terminals.

6. A pulse counter comprising at least two tunnel diodes each including a plate and a cathode, a source of direct-current voltage, a transformer having three windings, an electron tube having a cathode, a grid and a plate, two output terminals, two input terminals, one of said two input terminals being connected by means of a common ground connection to the cathodes of said tunnel diodes, the second one of said two input terminals being connected by means of respective capacitors to the plates of said tunnel diodes, resistors respectively interconnecting the plates of said tunel diodes to a junction point to which is also connected one end of the first one of the three windings of said transformer, the second end of said first winding being connected to one terminal of said source of direct-current voltage, the second terminal of said source of direct-current voltage being connected by means of the common ground connection to the cathodes of said tunnel diodes, coupling resistors interconnecting the plates of said tunnel diodes to form a chain, means connected to the plate of the last one of said tunnel diodes in the chain for driving said grid of said electron tube, means connecting the cathode of said tube to the cathodes of said tunnel diodes via said common ground connection, means including a capacitor connecting the plate of said electron tube to one end of the second winding of said transformer, the second end of said second winding being connected by means of the common ground connection to the cathodes of said tunnel diodes, the ends of the third winding of said transformer being respectively connected to the two output terminals.

7. A pulse counter comprising at least two tunnel diodes each having a plate and a cathode, a first source of direct-current voltage, an electron tube comprising a cathode, a grid and a plate, two input terminals, two output terminals, one of said two input terminals being connected by means of a common ground connection to the cathodes of said tunnel diodes, the second one of said two input terminals being connected by means of respective capacitors to the plates of said tunnel diodes, first resistors respectively connecting the plates of said tunnel diodes to a junction point to which is also connected one end of a second resistor, the second end of which is connected to one terminal of said first source of direct-current voltage, the second terminal of said first source being connected by means of the common ground connection to the cathodes of said tunnel diodes, coupling resistors interconnecting the plates of said tunnel diodes to form a chain, means for taking off a voltage from the plate of the last one of said tunnel diodes in the chain and for driving said grid of said tube, means connecting the cathode of said tube to the cathodes of said tunnel diodes via said common ground connection, means connecting the plate of said tube to a second source of direct-current voltage via a third resistor, means connecting the plate of tube by means of a capacitor to said junction point, means connecting the plate of said tube by means of another capacitor to one of said two output terminals, the second of which output terminals is connected by means of the common ground connection to the cathodes of said tunnel diodes.

References Cited in the file of this patent

UNITED STATES PATENTS 2,646,534 Manley ---------------- July 21, 1953

OTHER REFERENCES

1960 International Solid-State Circuits Conference, Feb. 10, 1960, pages 10–11.